United States Patent [19]

Bynoe

[11] Patent Number: 5,301,969
[45] Date of Patent: Apr. 12, 1994

[54] BICYCLE WITH JUMPING CAPABILITY

[76] Inventor: Wayne Bynoe, 1049 Massachusetts Ave., Arlington, Mass. 02174

[21] Appl. No.: 919,348

[22] Filed: Jul. 23, 1992

[51] Int. Cl.⁵ .................. B62M 1/20; B62K 19/00; B62K 19/18
[52] U.S. Cl. .................. 280/221; 280/226.1; 280/227; 280/282
[58] Field of Search ............ 280/221, 215, 216, 217, 280/212, 257, 270, 274, 226.1, 227, 282

[56] References Cited

U.S. PATENT DOCUMENTS

| | | | |
|---|---|---|---|
| 436,873 | 9/1890 | Hardy | 280/217 |
| 567,629 | 9/1896 | Young | 280/215 |
| 868,329 | 10/1907 | Corbitt | 280/215 |
| 2,638,359 | 5/1953 | Crumble | 280/215 |
| 2,965,393 | 12/1960 | Cauchon | 280/212 |
| 3,811,704 | 5/1974 | Gregoric | 280/216 |
| 4,353,569 | 10/1982 | Molina | 280/217 |
| 4,568,097 | 2/1986 | Farooq | 280/216 |
| 4,688,815 | 8/1987 | Smith | 280/216 |
| 5,035,678 | 7/1991 | Hageman | 474/50 |

Primary Examiner—Mitchell J. Hill
Attorney, Agent, or Firm—Weingarten, Schurgin, Cagnebin & Hayes

[57] ABSTRACT

A bicycle with jumping or leaping capabilities is disclosed wherein the bicycle selectively stores energy in compressible and tensionable members which form part of first and second bicycle frames. At a predetermined moment in time, the energy stored in the compressible and tensionable members is released causing the first and second frames to move in opposite directions thus effectuating a leap or jump.

15 Claims, 5 Drawing Sheets

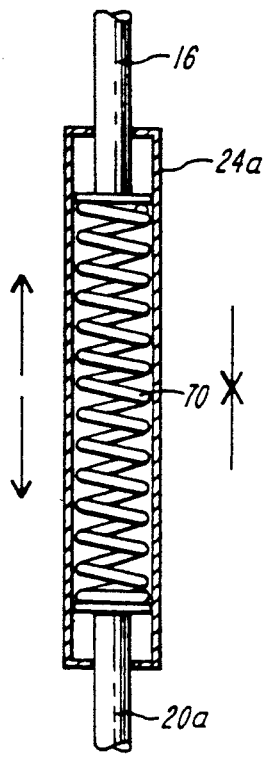
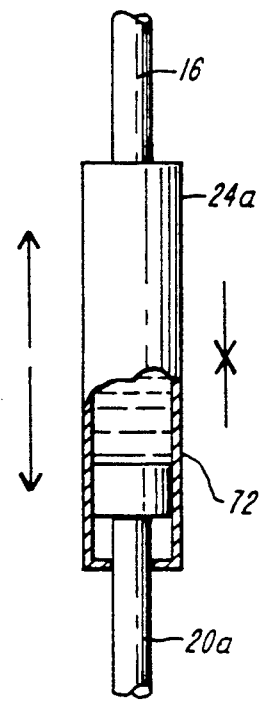
FIG. 2A  FIG. 2B
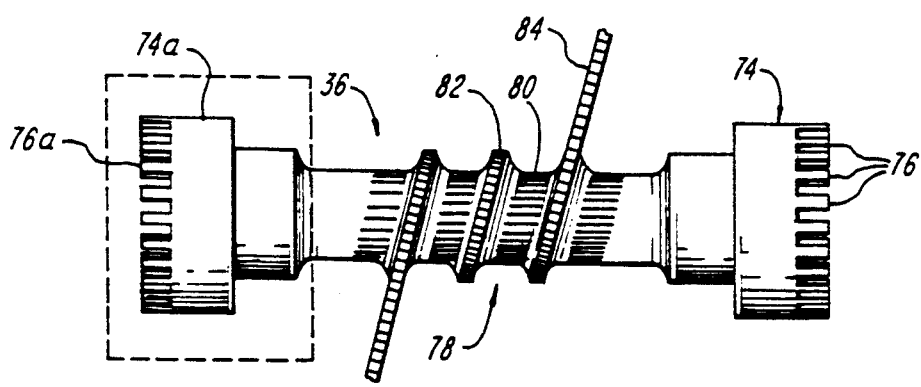
FIG. 4

BICYCLE WITH JUMPING CAPABILITY

FIELD OF THE INVENTION

This invention relates to bicycles and more particularly, to a bicycle with jumping or leaping capabilities.

BACKGROUND OF THE INVENTION

Bicyclists often encounter obstacles in their riding path or a change (rise) of the riding surface level Bicyclists who encounter such obstacles or rise in riding surface level while riding conventional bicycles must either dismount and walk the bicycle over or around the obstacle or rise in surface level, or veer around the obstacle or rise in surface level which often exposes the rider to increased danger from vehicular traffic Additionally, bicyclists who wish to jump with their bicycles for recreational purposes have previously had to use a ramp, mound or even an upwards jerking motion on the bicycle itself. None of these methods, however, are desirable or very successful.

Accordingly, what is absent in the prior art and required is a bicycle with jumping or leaping capabilities, which allows the rider to jump or leap over an obstacle or rise in surface level, or to jump or leap for enjoyment and competition at any time without the need for specialized accessories such as a ramp.

SUMMARY OF THE INVENTION

The present invention features a bicycle with jumping or leaping capabilities. The bicycle includes a first frame interior to a second frame. Each of the first and second frames includes a first upper portion and a second lower portion The upper and lower portions of the first interior frame are coupled by a plurality of compressible members having compressed and uncompressed states, and which are adapted for storing energy in the compressed state. The upper and lower portions of the second frame are coupled by a plurality of tensionable members, having tensioned and untensioned states, for storing energy in the tensioned state.

The first and second frames are coupled to at least first and second bicycle wheels proximate the lower portions of the first and second frames. The lower portions of the first and second frames are coupled to the first and second bicycle wheels by first and second pairs of pivotable frame connector members which allow the frames to pivot about the wheel axles.

The present bicycle further includes first and second frame coupling members which are rotatably engaged between at least two compressible members of the first frame and two tensionable members of the second frame. The first and second frame coupling members serve to maintain and hold the first and second frames securely in spaced relationship. Most importantly, the first and second frame coupling members are rotatably driven in one of a clockwise and counter-clockwise direction by means of a drive cable or chain coupled to the members, for compressing and tensioning the respective compressible and tensionable members.

In operation, an engagement pin located on one of the wheels of the present bicycle engages with a hook portion of a selectively engagable energizing hook which is depressed by the rider of the bicycle. Subsequent to the engagement of the engagement pin and the hook portion of the energizing hook, the energizing hook is pulled downwardly which in turn causes clockwise and counter-clockwise rotation of the first and second frame coupling members. Rotation of the frame coupling members in turn tensions and compresses the respective tensionable and compressible members thus storing energy in those respective members.

After a given period of time, the engagement pin is released from engagement hook which allows the compressible and tensionable members to release their stored energy causing the first or inner bicycle frame to move upwardly and the second bicycle frame to move downwardly with a "snapping" action thus effectuating a jump or leap of the bicycle.

DESCRIPTION OF THE DRAWINGS

These, and other features and advantages of the present invention will be better understood by reading the following detailed description, taken together with the drawings wherein:

FIGS. 2A and 2B illustrate alternative embodiments of the compressible members of the bicycle with jumping capability of the present invention;

FIG. 4 is a detailed schematic representation of a gear which serves to couple the frames and provide translational movement between the frames according to one embodiment of the bicycle of the present invention;

DETAILED DESCRIPTION OF THE INVENTION

Figure 1:
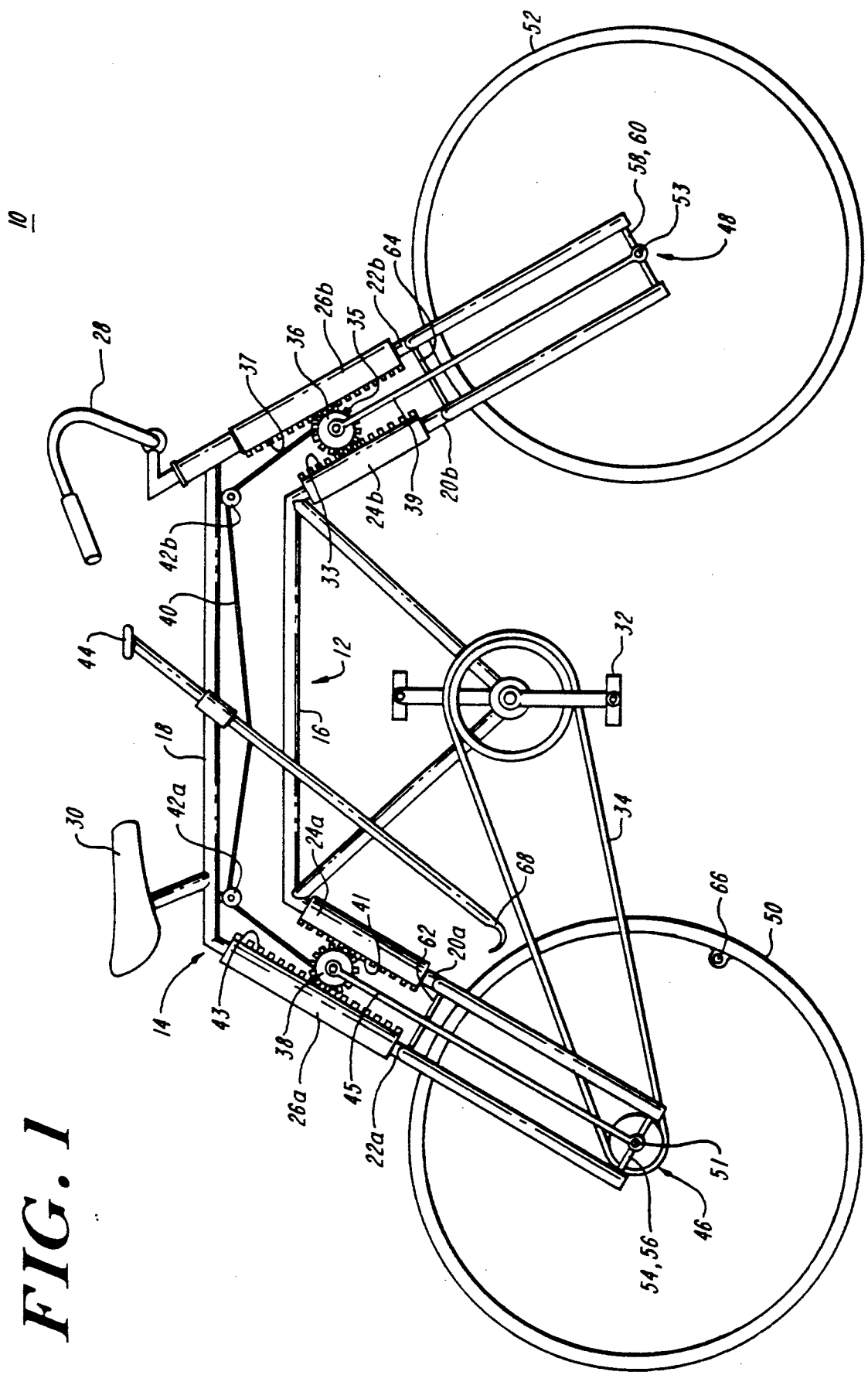
FIG. 1 is a schematic illustration of the bicycle with jumping capability of the present invention.

A first embodiment of the bicycle with leaping capability of the present invention is shown at 10, FIG. 1, and includes a first frame 12 interior to a second frame 14.

The first frame 12 is comprised of a first or upper "V" shaped portion 16, while the second frame 14 is comprised of a first, or upper portion 18. Each of the first and second frames also include one or more second or lower portions each of which include a plurality of segments such as first frame lower portion segments 20a–b and second frame lower portion segments 22a–b.

The first and second portions 16, 20a–20b of the first frame 12 are coupled by compressible members 24a–24b. The first and second portions 18, 22a–b of the second frame 14 are coupled by first and second tensionable members 26a and 26b.

In addition to the traditional bicycle features such as handlebars 28, seat 30, and pedals and chain 32 and 34, the present bicycle also includes first and second frame coupling members 36, 38.

The present invention also includes a first, frame coupling and energizing member 36 or area 35 which, in the present embodiment, includes at least one gear type surface. The first, frame coupling and energizing member is rotatably engaged with a gear type surface or area 33 of compressible member 35 24b of the first frame, and also with a gear type surface or area 37 of tensionable member 26b of the second frame. The first, frame coupling and energizing member 36 is supported by a pair of stabilizer bars or supports 39 (only one shown) which are attached to axle 53 of wheel 52.

Similarly, a second, frame coupling and energizing member 38, is rotatably engaged with a gear type surface or area 41 of compressible member 24a of the first frame, and also with a gear type surface or area 43 of tensionable member 26a of the second frame. The second, frame coupling and energizing member 38 is supported by a pair of stabilizer bars or supports 45 (only one shown), which are attached to axle 51 of wheel 50.

The first and second frame coupling members 36 and 38 are rotatably driven in a counter-clockwise and clockwise direction respectively by means of a coupled drive cable or chain 40, drive pulleys 42a and 42b and a selectively engagable energizing hook 44 as will be explained in greater detail below. The first and second frame coupling and energizing members 36, 38 also serve to maintain and hold the first and second frames 12, 14 securely in spaced relationship.

The present bicycle further includes first and second pairs of frame connectors 46, 48. Each of the pairs of frame connectors are coupled to first and second bicycle wheels 50, 52 respectively, for maintaining the first and second frames in spaced relationship. The first pair of frame connectors 46 includes first and second connector members 54, 56 secured to each of the second or lower frame portion segments 20a and 22a and to the first bicycle wheel 50. The first pair of connector members 46 are also coupled to and pivot about axle 51 of wheel 50.

Similarly, the second pair of frame connectors 48 includes first and second connector members 58, 60, secured to second or lower portions 20b and 22b of the first and second frames, for securing each of the first and second frames to the axle 53 of second bicycle wheel 52. The present bicycle may also include first and second pivotable connector members 62, 64 to further movably couple yet stabilize the first and second frames 12, 14 in spaced relationship.

The present bicycle further includes at least one energizing hook engagement pin 66 which selectively engages with hook portion 68 of the energizing hook 44, as will be described in greater detail below.

In operation, the present bicycle with leaping or jumping capabilities may be ridden and propelled as would any conventional bicycle. When the rider desires to effectuate a leap or jump, the rider merely depresses the selectively engagable energizing hook 44 which is movably secured against or passes through a hole or slot (not shown) in upper frame portion 18 of the second frame 14. In due course, engaging pin 66, which is rotating clockwise with the direction of wheels 50 and 52, will engage with hook portion 68 of selectively engagable energizing hook 44 and cause energizing hook 44 to be drawn or pulled downwardly. The downward pull on energizing hook 44 will cause drive cable 40, attached to the engagable energizing hook 44 to be pulled over drive pulleys 42a and 42b thereby causing counter-clockwise rotation of coupling and energizing member 36 and clockwise rotation of coupling and energizing member 38.

Counter-clockwise rotation of the first coupling and energizing member 36 engaged with tensionable member 26b, causes tensionable member 26b to expand from a first state of no tension, to a second tensioned state. Similarly, counter-clockwise rotation of first coupling and energizing member 36 engaged with compressible member 24b, compresses compressible member 24b, thus urging the compressible members from a first uncompressed state to a second compressed state. Thus, both the compressible member 24b and the tensionable member 26b store energy in their respective second compressed and tensioned states.

Similarly, clockwise rotation of coupling and energizing member 38 engaged with tensionable and compressible members 24a and 26a, urges compressible member 24a, as well as tensionable member 26a from a first uncompressed and untensioned state respectively, to a second compressed and tensioned state.

Eventually, as the bicycle travels in a forward direction, engaging pin 66 will "roll out" or be released from hook portion 68 of selectively engagable energizing hook 44, ending the urging of the compressible and tensionable members into their respective energy storing compressed and tensioned states. At such a moment, tensionable members 26a, 26b which are in a tensioned state will quickly release their energy thus quickly drawing the first and second portions 18, 22 of the second frame 14 quickly together. Likewise, the compressible members 24a-24b having stored energy in a compressed state, will quickly expand and release their stored energy thus forcing first and second portions 16, and 20a-20b of first frame 12 quickly apart. The quick release of energy from the tensionable and compressible members, the movement of the first and second frames, and the pivotable nature of the first and second pairs of pivotable frame connectors 46, 48 will generate a "snapping" action in the bicycle frame which will cause the bicycle to effectuate a jump or leap. Subsequently, the rider may once again selectively engage selectively engagable energizing hook 44 to restart the process and effectuate one or more subsequent jumps or leaps.

The compressible and tensionable members shown and described above may include several embodiments including a spring embodiment 70, shown in FIG. 2A to provide exemplary compressible member 24a, in which case spring 70 is provided as a tensionable spring in a case of the tensionable member 26a,b, and a compressible spring in the case of a compressible member 24a,b. Another contemplated embodiment includes piston 72, shown in FIG. 2B to provide exemplary compressible member 24a, which is also provided in the form of either a compressible or tensionable piston, as appropriate. Other similar energy storing members are contemplated and may be substituted as appropriate.

Figure 3:
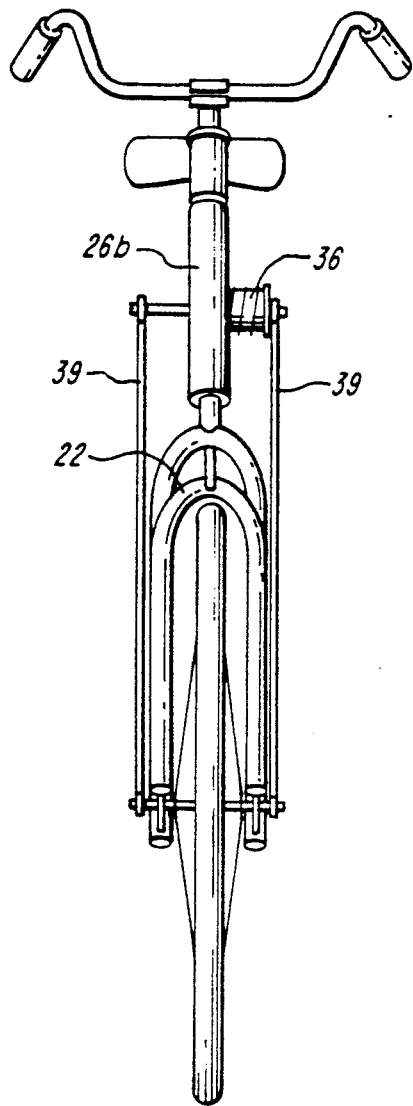
FIG. 3 is a front view of the bicycle of FIG. 1.

FIG. 3 illustrates a front view of the embodiment of the present bicycle shown in FIG. 1 in which is shown one tensionable member 26b, the forked lower portion 22b of the second frame, a portion of the first frame coupling and energizing member 36, and stabilizer bars or supports 39.

As shown in greater detail in FIG. 4, the first frame coupling and energizing member 36 (which is identical to the second frame coupling and energizing member 38) includes a first circular gear type portion 74 having a plurality of "teeth" 76 which rotatably engage with similar teeth on one surface of each of the coupled tensionable and compressible members. A second region 78 of the coupling and energizing member 36 (as well as coupling member 38) includes a plurality of grooves 80 into which a drive cable (not shown) may be inserted. In another embodiment, portion 78 of coupling members 36 and 38 may include a plurality of raised portions 82 having a number of projections or "teeth" which engage with a drive chain 84.

In another embodiment including a dual frame bicycle (as described below in conjunction with FIGS. 5-7), the coupling and energizing members also include a second circular gear type portion 74a having a second plurality of "teeth" 76a which rotatably engage with similar teeth on one surface of each of the adjacent coupled tensionable and compressible members.

Figure 5:
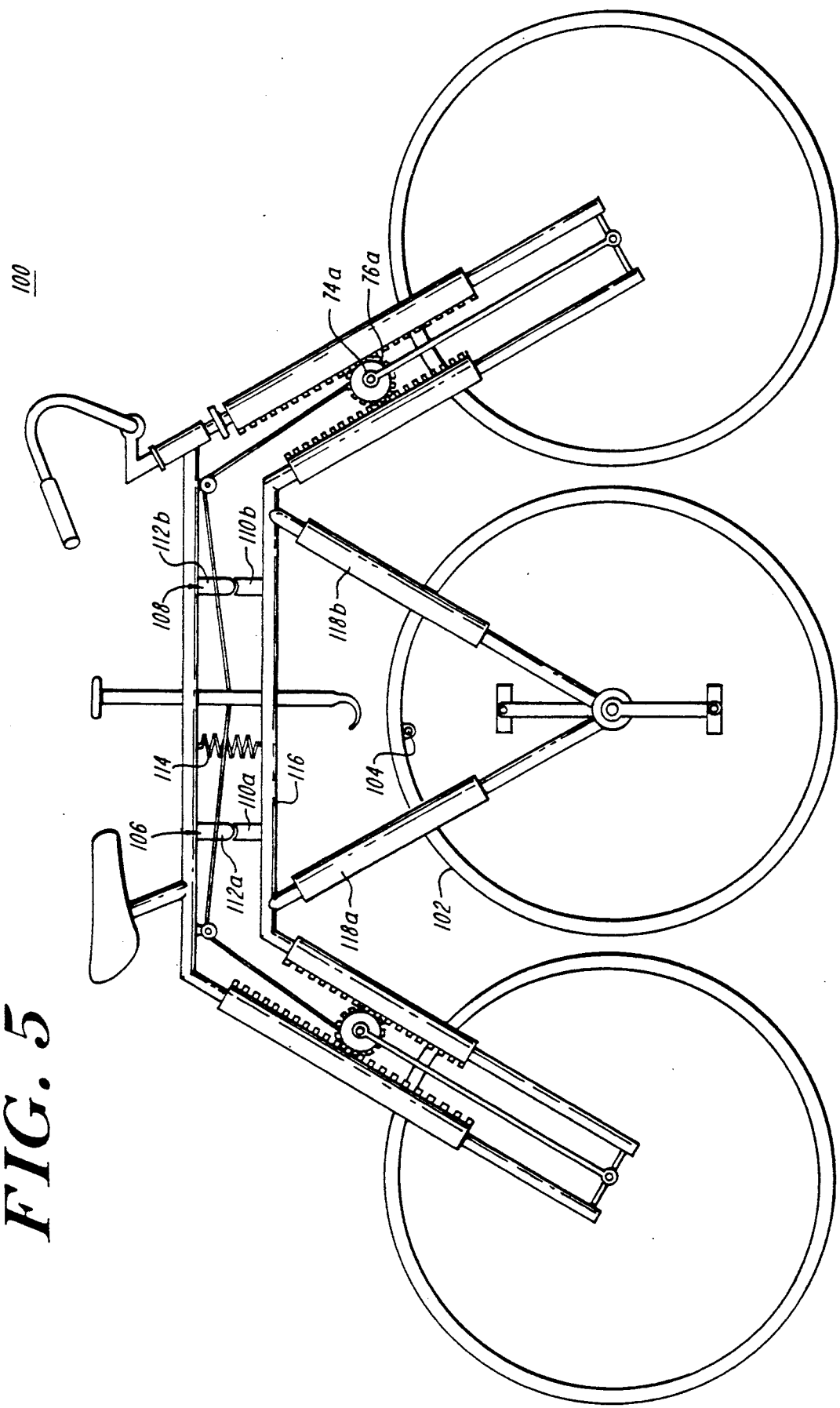
FIG. 5 is a schematic illustration of another embodiment of the bicycle with jumping capability of the present invention incorporating a third wheel.

A second embodiment of the present bicycle is shown generally at 100, FIG. 5. In addition to the previously described features, the embodiment shown in FIG. 5 includes a third wheel 102 including the engagement pin 104. In this embodiment, it is contemplated that third wheel 102 comprises a solid wheel, or wheel having a substantial mass, to facilitate forward movement of the bicycle as well as the bicycle jumping or leaping action. In this embodiment, the inner frame 116 coupled to the third wheel 102 will further include third and fourth compressible members 118a and 118b.

Further, either this embodiment, or the previous embodiment, may also include first and second frame stabilizers 106 and 108. Each of the frame stabilizers includes a first portion 110a, 110b having a concave or recessed depression. A second mating portion 112a, 112b is provided including a convex or generally circular protruding area which mates with the concave area of the first portions 110a, 110b. The bicycle frame stabilizers serve to maintain the upper portions of the first and second frames in alignment. Further, the upper portions of the first and second frames may be coupled to return spring 114 which is tensioned as the lower frame is compressed and the upper frame is expanded, thus adding to the return or "snapping" action of the bicycle upon effectuating a leap.

As shown in FIG. 1, the first and second frames 12, 14 include a "fork" region near the first and second bicycle wheels as is provided in a conventional bicycle frame. The embodiment of the present bicycle shown in FIG. 5 may instead include a fork or bifurcated region 120, FIG. 6 proximate the upper portion of the frame. Further, each of the first and second compressible or tensionable members are replaced by pairs of compressible or tensionable members as shown at 122, 124 which are coupled and tensioned by the "dual" geared coupling and energizing member shown in FIG. 4.

Figure 6:
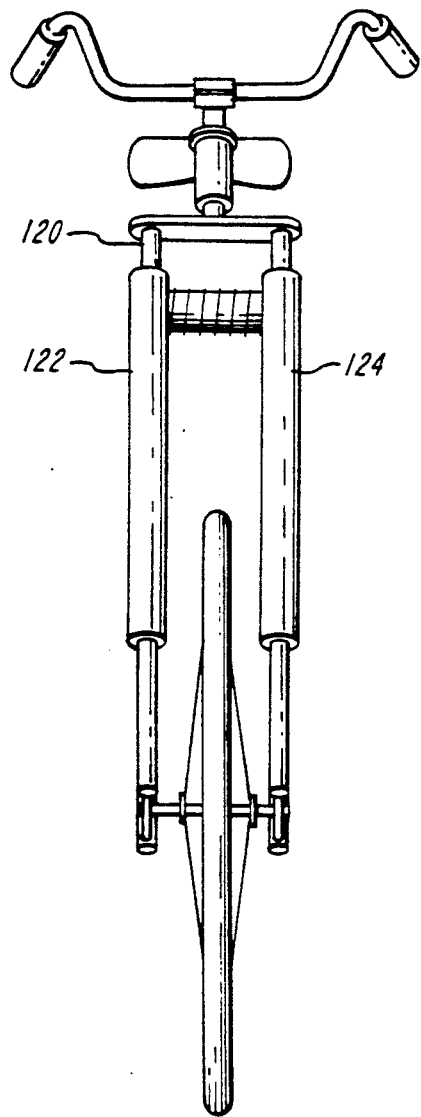
FIG. 6 is a front view of the bicycle with jumping capabilities of FIG. 5.
Figure 7:
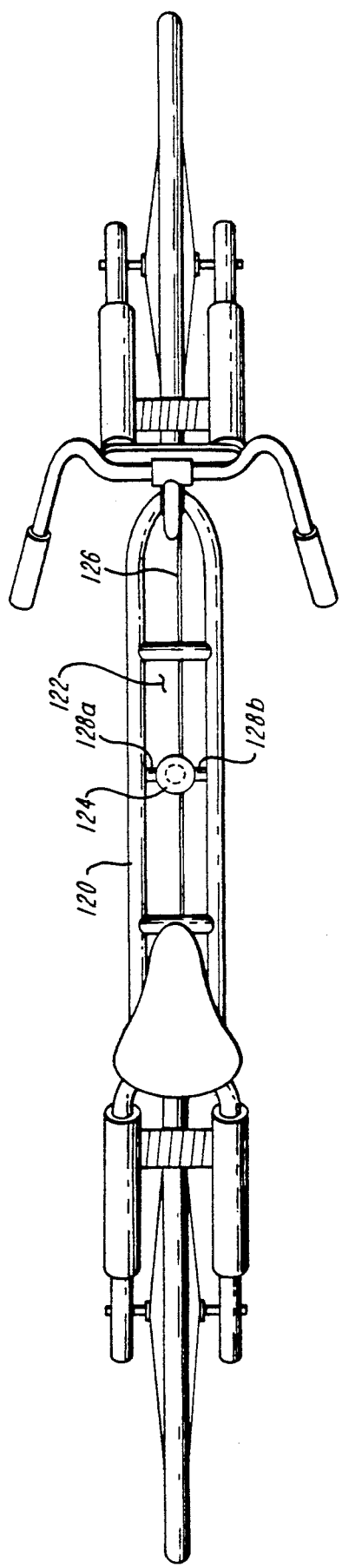
FIG. 7 is a top view of the bicycle with jumping capabilities of FIGS. 5 and 6.

A top view of the alternative embodiment of the present bicycle shown in FIGS. 5 and 6 is shown in FIG. 7 wherein is shown only an upper or first frame which is positioned directly above a similarly shaped but somewhat smaller second or lower frame (not shown). The central regions of the frames include an area or opening 122 through which the engagement hook 124 which is coupled to a wire or chain 126, passes. The engagement hook 124 may be held in place by limiting the size of the opening through which is passes or alternatively, by providing flexible or spring-like members 128a and 128b which serve to center and generally hold the engagement hook in place.

Modifications and substitutions by one of ordinary skill in the art are considered to be within the scope of the present invention which is not to be limited except by the claims which follow.

I claim:

1. A bicycle with jumping capability comprising:
 a first frame comprising first and second portions, said first and second portions connected by at least two compressible members, said at least two compressible members operative for storing energy in a compressed state;
 a second frame comprising first and second portions, said first and second portions coupled by at least two tensionable members, said at least two tensionable members operative for storing energy in a tensioned state;
 first and second frame connectors adapted for coupling to a first bicycle wheel and a second bicycle wheel, respectively, for maintaining said first and second frames in a spaced relationship, said first frame connector for securing a first region of each of said first and second frames to said first bicycle wheel, said second frame connector for securing a second region of each of said first and second frames to said second bicycle wheel;
 first and second frame coupling and energizing members, rotatably engaged with said first portions of both said first and second frames, for maintaining said first and second frames in spaced relationship, and for facilitating translational movement of said first portion of said first frame with respect to said first portion of said second frame;
 selectively engageable energizing means, coupled to said first and second frame coupling and energizing members, for urging said at least two compressible members into said compressed state, and for urging said at least two tensionable members into said tensioned state; and
 energy release means, coupled to said selectively engageable energizing means for releasing said energizing means and for allowing said at least two compressible members to move from said compressed state to an uncompressed state, and for allowing said at least two tensioned members to move from said tensioned state to an untensioned state, said movement of said at least two compressed and tensioned members effecting rapid translational movement of said first portion of said first frame member with respect to said first portion of said second frame member, causing said bicycle to jump.

2. The bicycle of claim 1 wherein each of said first and second frames includes first and second fork portions proximate said first and second wheels respectively.

3. The bicycle of claim 1 wherein each of said first and second frame coupling and energizing members include at least one gear portion.

4. The bicycle of claim 3 wherein each of said first and second frame coupling and energizing members include two gear portions.

5. The bicycle of claim 4
 wherein said second frame includes four tensionable members; and
 wherein said first frame is coupled to a third bicycle wheel and further includes six compressible members.

6. The bicycle of claim 1 wherein said first frame is coupled to a third bicycle wheel and further includes four compressible members.

7. The bicycle of claim 1 wherein said selectively engagable energizing means includes an engaging hook, coupled to said first and second frame coupling and energizing members, said engaging hook operative for engaging with an engagement pin disposed on one of said first and second bicycle wheels.

8. The bicycle of claim 7 wherein said engaging hook is coupled to said first and second frame coupling and energizing members by means of a cable.

9. The system of claim 7 wherein said engaging hook is coupled to said first and second frame coupling and engaging members by means of a chain.

10. The system of claim 7 wherein said energy release means includes means for disengaging said engaging hook and said engagement pin.

11. The system of claim 10 wherein said means for disengaging includes a curved hook portion disposed on said engaging hook, for disengaging said engaging hook from said engagement pin after a generally predetermined amount of forward movement of said bicycle.

12. A bicycle with jumping capability comprising:
a first frame comprising first and second portions, said first and second portions connected by at least two compressible members, said at least two compressible members operative for storing energy in a compressed state;
a second frame comprising first and second portions, said first and second portions coupled by at least two tensionable members, said at least two tensionable members operative for storing energy in a tensioned state;
first and second frame connectors adapted for coupling to a first bicycle wheel and a second bicycle wheel, respectively, and for maintaining said first and second frames in spaced relationship, said first frame connector for securing a first region of each of said first and second frames to said first bicycle wheel and said second frame connector for securing a second region of each of said first and second frames to said second bicycle wheel; and
operator actuatable means for urging said at least two compressible members into a compressed state and said at least two tensionable members into a tensioned state and for releasing said at least two compressible members from said compressed state to an uncompressed state, and for releasing said at least two tensioned members from said tensioned state to an untensioned state, said release of said at least two compressed and tensioned members effecting rapid translational movement of said first portion of said second frame member, causing said bicycle to jump.

13. The bicycle recited in claim 12 further comprising first and second frame coupled and energizing members, rotatably engaged with said first portions of both said first and second frames, for maintaining said first and second frames in spaced relationship, and for facilitating translational movement of said first portion of said first frame with respect to said first portion of said second frame.

14. The bicycle recited in claim 13 wherein each of said first and second frame coupling and energizing members include at least one gear portion.

15. The bicycle recited in claim 14 wherein each of said first and second frame coupling and energizing members include two gear portions.

* * * * *

UNITED STATES PATENT AND TRADEMARK OFFICE
CERTIFICATE OF CORRECTION

PATENT NO. : 5,301,969

DATED : April 12, 1994

INVENTOR(S) : Wayne Bynoe

It is certified that error appears in the above-identified patent and that said Letters Patent is hereby corrected as shown below:

Title page, after the Abstract, after "Attorney, Agent, or Firm", "Cagnebin" should read —Gagnebin—.

Column 2, line 65, "member 35 24b" should read —member 24b—.

Column 2, line 64, before "is" should read --36--.

Column 8, line 16, "coupled" should read —coupling—.

Signed and Sealed this

First Day of November, 1994

Attest:

BRUCE LEHMAN

Attesting Officer
Commissioner of Patents and Trademarks